US011070990B1

(12) United States Patent
Pikle et al.

(10) Patent No.: US 11,070,990 B1
(45) Date of Patent: Jul. 20, 2021

(54) SYSTEMS AND METHODS FOR MAINTAINING NETWORK QUALITY

(71) Applicant: T-Mobile USA, Inc., Bellevue, WA (US)

(72) Inventors: Jatin S. Pikle, Sammamish, WA (US); Paul Bongaarts, Issaquah, WA (US)

(73) Assignee: T-MOBILE USA, INC., Bellevue, WA (US)

( * ) Notice: Subject to any disclaimer, the term of this patent is extended or adjusted under 35 U.S.C. 154(b) by 0 days.

(21) Appl. No.: 16/744,790

(22) Filed: Jan. 16, 2020

(51) Int. Cl.
*H04W 24/02* (2009.01)
*H04L 12/24* (2006.01)

(52) U.S. Cl.
CPC ......... *H04W 24/02* (2013.01); *H04L 41/5025* (2013.01); *H04L 41/5032* (2013.01); *H04L 41/5054* (2013.01)

(58) Field of Classification Search
CPC .............. H04W 24/02; H04L 41/5025; H04L 41/5054; H04L 41/5032
USPC .................. 455/414.1, 418, 446, 450–452.2, 455/456.1–457
See application file for complete search history.

(56) References Cited

U.S. PATENT DOCUMENTS

| 6,141,557 | A | * | 10/2000 | Dipiazza | H04W 16/02 455/446 |
| 7,142,868 | B1 | * | 11/2006 | Broyles | H04W 16/00 455/453 |
| 2012/0252467 | A1 | * | 10/2012 | Chen | H04W 16/18 455/446 |
| 2015/0009857 | A1 | * | 1/2015 | Rath | H04L 41/145 370/254 |
| 2015/0341502 | A1 | * | 11/2015 | Udeshi | H04W 16/18 455/405 |
| 2020/0092732 | A1 | * | 3/2020 | Raj | H04W 24/08 |

* cited by examiner

*Primary Examiner* — Michael Y Mapa
(74) *Attorney, Agent, or Firm* — Loeb & Loeb LLP

(57) ABSTRACT

A computer-implemented method including receiving network architecture data of a network in a geographical region, receiving an input network criteria associated with the network, receiving a threshold service level corresponding to the network criteria, and receiving housing data for the geographical region. The method includes determining a network service projection for the geographical region based on the housing data. Based on the threshold service level and the network service projection, the method includes determining an updated network architecture that satisfies the threshold service level. The method includes generating an updated network architecture report indicating changes to the infrastructure of the network to satisfy the threshold service level.

16 Claims, 6 Drawing Sheets

SYSTEMS AND METHODS FOR MAINTAINING NETWORK QUALITY

BACKGROUND

The background description provided herein is for the purpose of generally presenting the context of the disclosure. The work of the presently named inventors, to the extent it is described in this background section, as well as aspects of the description that may not otherwise qualify as prior art at the time of filing, are neither expressly nor impliedly admitted as prior art against the present disclosure.

Traditionally, cellular networks have been used to provide wireless network access and telecommunications to mobile devices, such as cellular telephones and other mobile devices. For high speed network access in homes, offices, places of business, etc., users have instead traditionally utilized hard-wired network access methods such as cable, telephone lines, digital subscriber line (DSL), etc., and may use a hard-wired modem and router to provide access to devices within range. As cellular networks have evolved to provide higher speeds and broader access, cellular network providers have begun to offer high-speed, home broadband network access to growing numbers of homes or businesses.

SUMMARY

The following presents a simplified summary of the present disclosure in order to provide a basic understanding of some aspects of the disclosure. This summary is not an extensive overview of the disclosure. It is not intended to identify key or critical elements of the disclosure or to delineate the scope of the disclosure. The following summary merely presents some concepts of the disclosure in a simplified form as a prelude to the more detailed description provided below.

In an embodiment, the disclosure describes a computer-implemented method comprising receiving network architecture data relating to an infrastructure of a cellular network in a geographical region. The network architecture data may include a location of one or more cellular base stations in the geographical region. The method may include receiving an input of at least one network criterion associated with the cellular network and receiving an input of a threshold service level corresponding to the at least one network criterion. The method may include receiving housing data for the geographical region from a housing database. The method may include determining a network service projection for the geographical region based at least partially on the housing data. Based on the input of the threshold service level of the at least one network criterion and the determined network service projection, the method may include determining an updated network architecture that satisfies the threshold service level under conditions of the network service projections. The method may include generating an updated network architecture report indicating changes to the infrastructure of the cellular network in the geographical region to satisfy the threshold service level.

In other embodiments, the disclosure describes a computer-implemented method comprising receiving network architecture data relating to an infrastructure of a cellular network in a plurality of geographical regions. The network architecture data may include a location of one or more cellular base stations in each of the plurality of geographical regions. The method may include receiving an input of at least one network criterion associated with the cellular network, receiving an input of a threshold service level corresponding to the at least one network criterion, and receiving housing data for each of the plurality of geographical regions. The method may include determining a network service projection for each of the plurality of geographical regions based at least partially on the housing data. Based on the input of the threshold service level of the at least one network criterion and the determined network service projection, the method may include determining an updated network architecture that satisfies the threshold service level under conditions of the network service projections for each of the plurality of geographic regions. The method may include generating an updated network architecture report for each of the plurality of geographic regions comparing changes to the infrastructure of the cellular network to satisfy the threshold service level in each of the plurality of geographical regions.

In other embodiments, the disclosure describes a computer-implemented method comprising receiving network architecture data relating to an infrastructure of a cellular network in a geographical region. The network architecture data may include a location of one or more network assets in the geographical region. The method may include providing a graphical user interface for requesting and receiving a user selection of at least one network criterion associated with the cellular network and a threshold service level corresponding to the at least one network criterion. The method may include receiving a user selection of at least one network criterion associated with the cellular network via the graphical user interface and receiving a user input of a threshold service level corresponding to the selected at least one network criterion via the graphical user interface. The method may also include receiving housing data for the geographical region and determining a network service projection for the geographical region based at least partially on the housing data. The network service projection may include a projected demand for cellular home broadband service. Based on the user input of the threshold service level of the selected at least one network criterion and the determined network service projection, the method may include determining an updated network architecture that satisfies the user input of the threshold service level under conditions of the network service projections. The method may include generating an updated network architecture report indicating changes to the infrastructure of the cellular network in the geographical region to satisfy the user input of the threshold service level.

BRIEF DESCRIPTION OF THE DRAWINGS

The invention may be better understood by references to the detailed description when considered in connection with the accompanying drawings. The components in the figures are not necessarily to scale, emphasis instead being placed upon illustrating the principles of the invention. In the figures, like reference numerals designate corresponding parts throughout the different views.

Figure 1:
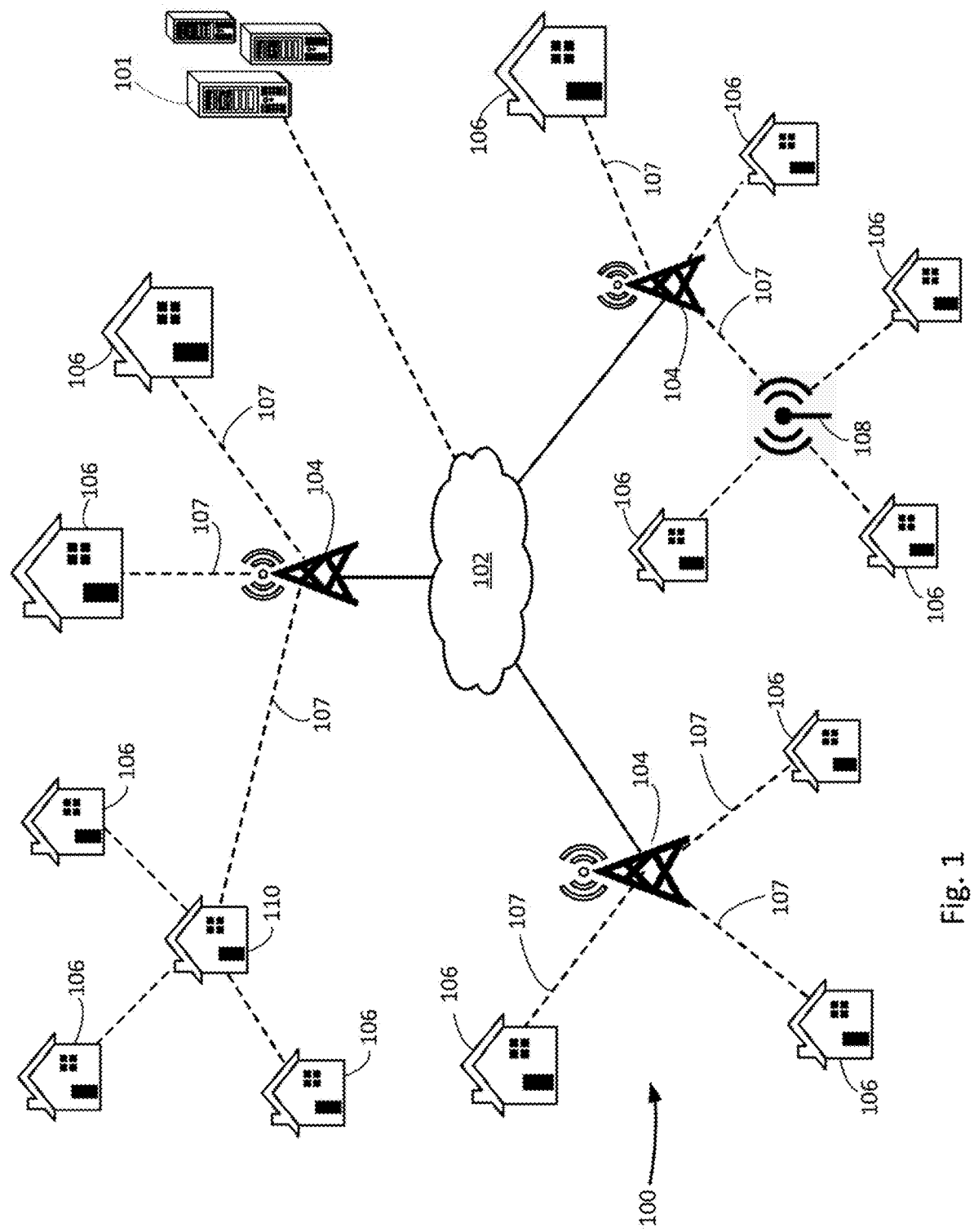
FIG. 1 is a high level diagram of an embodiment of a wireless broadband accordance with the disclosure.

Persons of ordinary skill in the art will appreciate that elements in the figures are illustrated for simplicity and clarity so not all connections and options have been shown to avoid obscuring the inventive aspects. For example, common but well-understood elements that are useful or necessary in a commercially feasible embodiment are not often depicted in order to facilitate a less obstructed view of these various embodiments of the present disclosure. It will be further appreciated that certain actions and/or steps may be described or depicted in a particular order of occurrence while those skilled in the art will understand that such specificity with respect to sequence is not actually required. It will also be understood that the terms and expressions used herein are to be defined with respect to their corresponding respective areas of inquiry and study except where specific meaning have otherwise been set forth herein.

DETAILED DESCRIPTION

The present invention now will be described more fully hereinafter with reference to the accompanying drawings, which form a part hereof, and which show, by way of illustration, specific exemplary embodiments by which the invention may be practiced. These illustrations and exemplary embodiments are presented with the understanding that the present disclosure is an exemplification of the principles of one or more inventions and is not intended to limit any one of the inventions to the embodiments illustrated. The invention may be embodied in many different forms and should not be construed as limited to the embodiments set forth herein; rather, these embodiments are provided so that this disclosure will be thorough and complete, and will fully convey the scope of the invention to those skilled in the art. Among other things, the present invention may be embodied as methods or devices. Accordingly, the present invention may take the form of an entirely hardware embodiment, an entirely software embodiment or an embodiment combining software and hardware aspects. The following detailed description is, therefore, not to be taken in a limiting sense.

Network providers, such as entities providing cellular network and data service, may use various hardware, software, system architecture, or other tools and systems to provide systems and methods to maintain network quality for its users. For example, a network provider may take measure to ensure that adequate bandwidth, speed, spectrum, availability or other quality of service (QoS) measures meet certain expectations or levels that may be deemed appropriate for a particular service or network. A network provider may invest significant capital in expanding the geographic reach of a telecommunications or data network to attain or maintain QoS in each geographic area. Traditionally, network or other cellular service providers may have deployed cell sites to expand the reach, coverage, speed, or capacity of an existing network. In some cases, cell cite deployment may be limited or otherwise impacted by factors such as geographic terrain, housing density, etc. As housing density in a particularly geographic area may change over time, a corresponding economic analysis related to the strategic deployment of a particular cell site at a particular location may also change. For example, the economic analysis may change if additional cell sites may be required to provide network services to a growing subscriber base in a geographic region growing in housing or population density. The systems and method described herein may, in some embodiments, provide practical applications for dynamically determining differing deployment structures that may service and grow with a specific geographic region over time or within a particular period of time.

In some embodiments, the disclosure describes systems and method for analyzing existing telecommunications networks and determining alternatives for deployment structures that may service present-day network load and load types as well as projected network loads and load types. In some embodiments, the projected loads or other needs of the network infrastructure may be based on various inputs and/or factors such as determinations of projected population or housing growth, regional changes in population density, etc. In some embodiments, a source of input in determining geographic regions of interest may be the current competition of broadband providers within that geographic region. One source of such information may be the Federal Communications Commission's (FCC) Form 477 that includes broadband deployment data at a census block level. In some embodiments, projections of population and broadband demand may be at least partially based on the number, type, and overall presence of broadband providers in a particular geographic region. Based on these projections, in some embodiments, the system may determine how to bolster or otherwise modify existing network architecture or infrastructure, or whether to add particular network infrastructure, to accommodate varying growth projections. In some embodiments, the determination of how to modify network architecture to accommodate growth projections may be based on one or more network criteria, such as QoS, quality of experience (QoE), network efficiency, economic efficiency, etc. In other words, one or more recommendations for network infrastructure deployment may be determined to accommodate pre-determined levels of the one or more network criteria or a set of network criteria in order to best leverage current network assets to deliver services, such as home broadband services. In some embodiments, the set of network criteria may dictate a threshold service level provided to network subscribers in a given geographic region, and the system may determine one or more network infrastructure changes that may meet or exceed that threshold service level.

In some embodiments, the system and method described herein in may be implemented specifically to improve, maintain, or make possible a threshold service level for wireless home or business broadband access via a cellular network. In some embodiments, the network service provider may provide an in-home router or WiFi gateway device that may convert a cellular signal (e.g., long term evolution (LTE), 3G, 4G, 5G, etc.) to a WiFi signal accessible by WiFi suitable devices in a subscriber's home or business. In some embodiments, the WiFi gateway may be restricted to use only in the geographical location of a particular subscriber's home or business.

In some embodiments, the system may employ machine learning techniques or algorithms that may iterate through one or more growth projections for a geographic region and one or more possible network infrastructure deployment structures. The machine learning algorithms may be deployed based on the network criteria described above to fulfill a threshold service level. The output of such machine learning techniques may then be used to allocate or otherwise deploy network architecture or infrastructure such as updating or modifying current cell sites, adding additional cell sites at particularly determined locations, or otherwise recommend various deployment structures using available or contemplated resources such as cell sites, FemtoCell devices, fixed wireless devices, etc., based on the set of network criteria.

In some embodiments, some of the alternate deployment structures for network infrastructure may utilize a hub and spoke architecture. In such embodiments, a particular cell site, such as a macro cell site, small cell cite, distributed antenna systems (DAS), and/or a subscriber location may act as a "hub" and may provide primary coverage for other subscribers in a geographic region. Devices such as fixed wireless devices, FemtoCell devices, small cells, etc., may act as "spokes" to provide coverage, for example, for geographic regions that have high household density or geographic terrain that may obstruct a radiofrequency (RF) signal from a macro cell site. In some embodiments, the hub may include a backhaul to a macro base station due to geographical or other circumstances, and provide connection to other subscribers that may not have line of sight, hard wired, or other access to the macro cell site. In some embodiments, the spoke devices may use unlicensed spectrum to provide network access to user devices, such as mobile phones, computers, or other network connected electronics. The system may contemplate changes in household density over time and recommend locations of additional cell sites that may also leverage a hub and spoke architecture with fixed wireless, FemtoCell, or other spoke devices. In some embodiments, Millimeter Wave (mmWave) technology may be used to transport network data between the hub (e.g., small cell site) and spoke devices, though other suitable forms of wireless broadband data transfer may be contemplated. In some embodiments, mmWave transport technology, for example, using integrated access and backhaul (IAB), may be used for hub and spoke network topologies where line of sight, propagation distance, and capacity criteria may be fulfilled, and may provide advantages over lower frequency signals.

FIG. 1 illustrates an embodiment of a cellular network, such as a wireless broadband system 100 that may be used to provide home or business wireless broadband services in which the described system and methods for maintaining network quality may be implemented. Those skilled in the art will appreciate that the system 100 represented in FIG. 1 is merely exemplary of a wireless broadband system and that the disclosed system and methods may be applied to other wireless broadband or non-broadband systems as well. The system 100 may include a cellular network 102, which may include any of a variety of components suitable to provide cellular network services to subscribers or other users. A network provider server 101 may be connected to or part of the network 102. In some embodiments, the network provider server 101 may collect data from one or more network components and from other data sources. The cellular network 102 may be connected to other external networks such as the Internet or other cellular networks, and may provide subscribers with data access throughout.

The system 100 may include one or more cell sites or base stations 104 that may be part of a radio access network (RAN). The RAN may be one of a variety of network types known to those skilled in the art, such as the Evolved Universal Terrestrial Radio Access Network (E-UTRAN), Universal Mobile Telecommunications System (UMTS), High Speed Packet Access/High Speed Uplink Packet Access (HSPA/HSDPA), or 5th Generation (5G) new radio (NR). In some embodiments, the base stations 104 may include E-UTRAN Node B) ("eNB" or "eNodeB) (e.g., for LTE networks), base transceiver station (BTS) (e.g., for GSM networks), Node B (e.g., for UTRA of UMTS), Home eNodeBs (HeNB), Donor eNodeBs (DeNB), and Relay Nodes (RN), but those skilled in the art will recognize that the RAN may be made up of other suitable types of base stations. In some embodiments, the base stations 104 may also include one or more millimeter wave (mmWave) links that may be capable of transmitting mmWave data. Millimeter wave data may relate to extremely high frequency (EHF) radio frequencies in the electromagnetic spectrum between 30 and 300 gigahertz (GHz). Radio waves in this band may have wavelengths from one millimeter to ten millimeters. Due to the relatively small wavelength of signals using of mmWave data transport, cross-signal interference may be minimized. Similarly, the relatively short wavelengths used in mmWave transport may permit use of smaller antennas to achieve comparable high directivity and high gain as could be achieved only by larger antennas in lower bands. This high directivity, coupled with high free space loss at mmWave frequencies, may provide for a more efficient use of frequencies for point-to-multipoint applications. For example, a single base station 104 or adjacent base stations may transmit data at the same or similar frequency to many different locations without interference. Since a greater number of highly directive antennas may be placed in a given area, the net result may greater frequency reuse, and higher density of users.

The system may also include various subscriber locations 106. The subscriber locations 106 may be homes, businesses, or any other location where a subscriber may use wireless broadband network services. In the embodiment shown in FIG. 1, each base station 104 may provide network access to one or more subscriber locations 106. In some embodiments, the base station 104 and corresponding subscriber locations 106 may be arranged in a hub and spoke arrangement, where a single base station 104 ("hub") provides network access to multiple subscriber locations 106 ("spokes"). In such embodiments, the hub and spoke arrangement may be repeated indefinitely for each base station 104 in the system 100. The base stations 104 may provide wireless network service 107 and/or backhaul connection to the subscriber locations 106 via one of a variety of wireless methods for various networks, such as mmWave transport, LTE, 2G, 3G, 4G, 5G, etc. The network service 107 may be bidirectional. In some embodiments, a small cell site 108 or other network architecture (e.g., distributed antenna system (DAS)) may act as a "spoke" in a hub and spoke architecture, with a base station 104 acting as the hub. In such embodiments, the small cell site 108 may have a fixed or wireless backhaul connection 107 to the "hub" base station 104, and provide network services to one or more subscriber locations 106 using wireless methods. In some embodiments, a subscriber location may also act as a subscriber location spoke 110. In such embodiments, a subscriber location, such as a home or business, may have a wired or wireless backhaul connection 107 to the base station 104 and may also provide wireless network connection to other subscriber locations 106. In some embodiments, the small cell site 108 or subscriber location spoke 110 may have line of site with a base station 104 to enable mmWave or IAB transmissions, particularly if the subscriber locations 106 receiving signals from the small cell site or subscriber location spoke may not have line of sight due to geographical or terrain restrictions. In other words, mmWave transmission and/or backhaul between a base station 104 and a small cell site 108 or subscriber location spoke 110 may be used when the geography or topography of the geographic region allow for it, but other backhaul connection methods may be used in other embodiments. In some embodiments, the small cell site 108 or subscriber location spoke 110 may additionally provide background connections to other small cell sites or subscriber location spokes, and thus become hubs of their own. Those skilled in the art will recognize that such a hub and spoke architecture may be iterated substantially indefinitely. In some embodiments, the hubs may also be referred to as "donor nodes," and spokes may also referred to as "relay nodes." A macro hub or base station 104 may provide transport to a spoke or relay node (e.g., the small cell 108 subscriber location spoke 110). The base station 104 may serve as a transport "donor" in addition to providing broadband service to subscribers within its coverage area. The spokes/relays may provide service to subscribers within their coverage area. Of course, while a hub and spoke arrangement is shown in FIG. 1, those skilled in the art will appreciate that other arrangements may be used within the scope of the disclosure.

Figure 2:
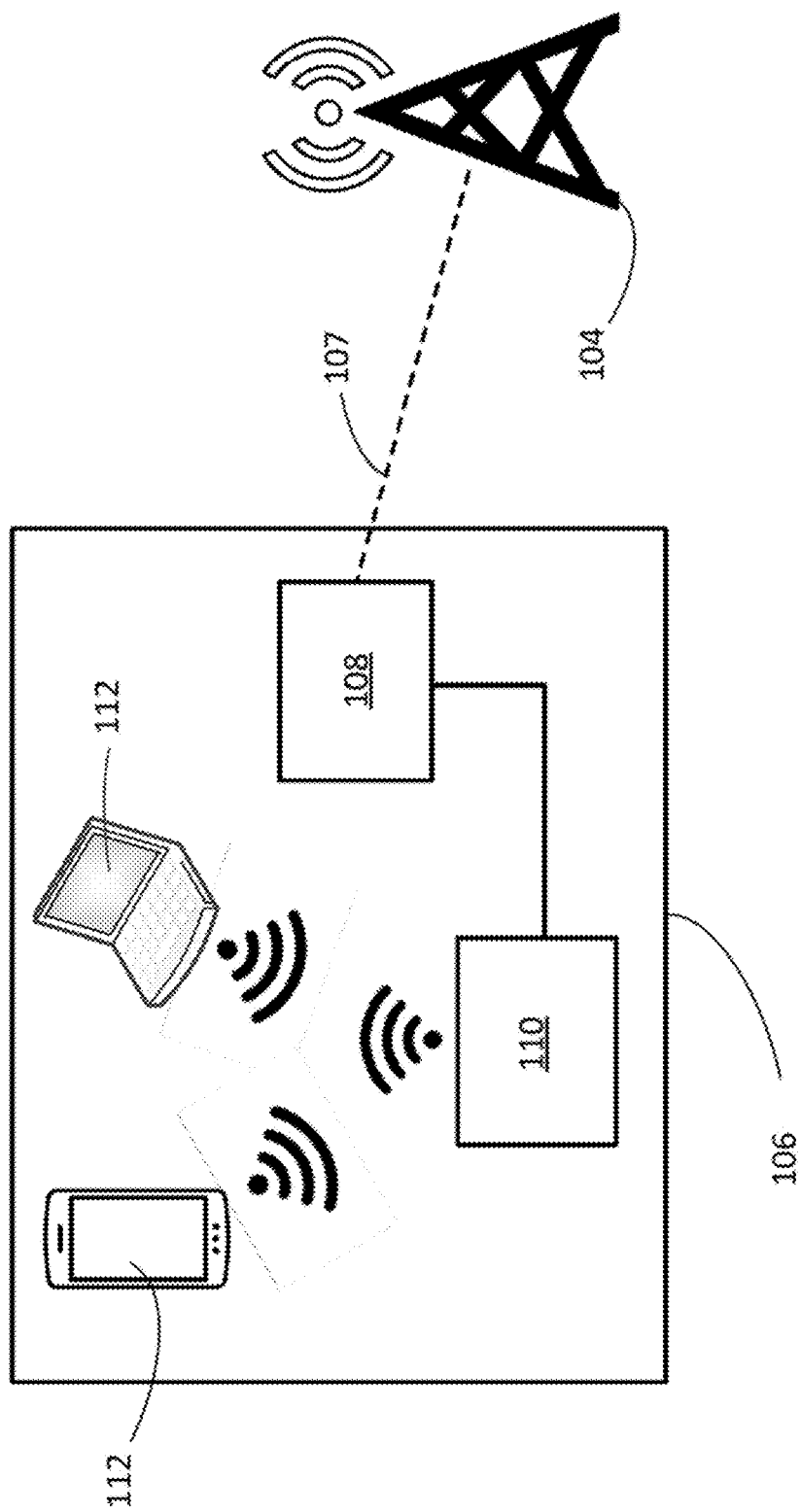
FIG. 2 is a diagram of components of an embodiment of a subscriber location of the wireless broadband system of FIG. 1.

FIG. 2 illustrates an embodiment of a subscriber location 106 that may receive wireless network data from a base station 104. The subscriber location 106 may include a wireless receiver 108, such as a fixed wireless device, a FemtoCell, or any other suitable device for receiving and transmitting wireless signals to and from the base station 104. In some embodiments, a FemtoCell device may be a small, low powered cellular base station. The FemtoCel device may connect to a service provider's network via broadband (e.g., cable, DSL, mmWave, fixed wireless device or antenna). The FemtoCell device may provide wireless cellular network access to subscribers in range. In some embodiments, a fixed wireless devices may include a fixed wireless antenna that may be a directional radio antenna that may be capable of receiving and transmitting network signals from and to a cell site. May be used to connect FemtoCell devices to the service provider's network.

The subscriber location 106 may also include a wireless router 110 that may be connected to the wireless receiver 108 and, in some embodiments, may be part of the wireless receiver. The wireless router 110 may be connected to the wireless receiver 108 either hardwired or wirelessly. The wireless router 110 may receive and transmit data to the wireless receiver 108 and may provide a WiFi connection to one or more computing devices 112 within range. In some embodiments, the wireless receiver 108 and/or wireless router 110 may be restricted to use within a particular subscriber location 106. The wireless router may transmit data from the computing devices 112 to the wireless receiver 108 for transmission to the base station 104. In some embodiments, there may be line-of-sight between the base station 104 and each subscriber location 106 that receives data from each respective base station.

Figure 3:
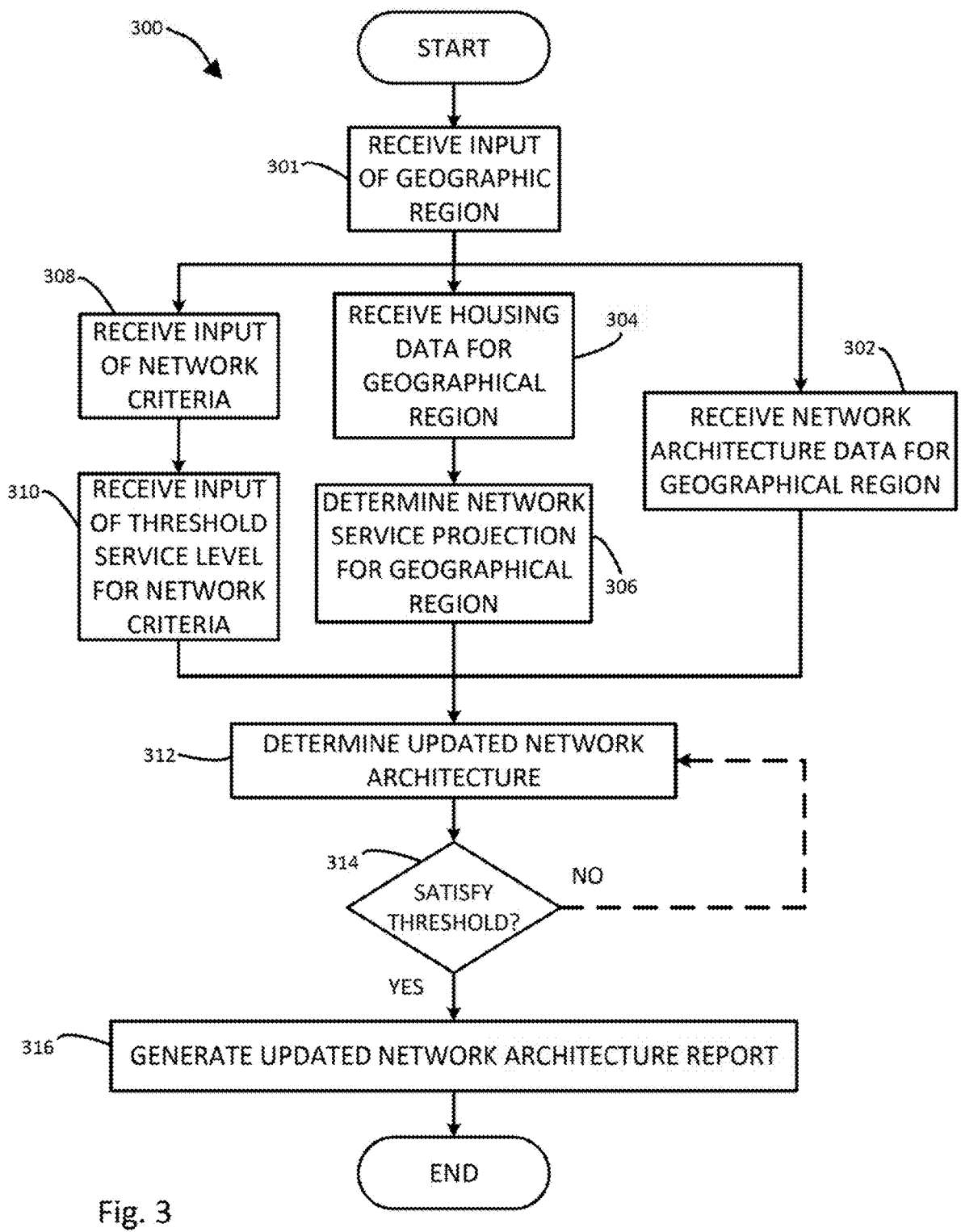
FIG. 3 is a flow diagram of an embodiment of a method of maintaining network quality in accordance with the disclosure.

In some embodiments, the disclosure describes systems and method for analyzing existing telecommunications networks and architecture to determine potential deployment structures that may provide for more efficient network services, such as home or business cellular broadband services. In some embodiments, the methods may be performed on a computer or computer server, such as the network provider server 101 in FIG. 1, but may be performed using other suitable computer or computer systems as well, and may include other servers, computers, or databases on or off the service provider server. FIG. 3 shows an embodiment of a method for maintaining network quality. At 301, the method may include receiving an input of one or more geographic regions for which to perform an economic analysis. In some embodiments, the input may be received from a user via a user interface or, in some embodiments, may be determined automatically based on the nature of a particular analysis. In some embodiments, the geographic region may be relatively small, such as a census block or small neighborhood, or may be an entire city, state, or other geographic region. The geographical region may be any geographical region for which as service provider may have network infrastructure in place, or any geographical region where a service provider or user would like to potentially determine what type of network infrastructure may be useful in providing service to the geographical region. In some embodiments, the geographical region may be small and/or focused and include relatively small network infrastructure, or may be large and/or diffuse in other embodiments, or any other type of region.

At 302, the method may include receiving network architecture data for the geographical region. In some embodiments, the network architecture data may relate to the network infrastructure for a specific network provider, such as cell sites, base stations, or other network assets. The network architecture data may be retrieved from any suitable information repository, such as a network architecture database, record, log, etc. In some embodiments, the network architecture data may be received in response to a user request or an automated request triggered by another user action, such as a request to perform an economic analysis. In some embodiments, another input may be the coverage matrix (signal strength) of all relevant sites for the different spectrum bands in use for a given geographic region. The signal strength at a particular location may be compared against a link budget threshold for broadband service to determine which geographic regions qualify to provide network service. The link budget may be an accounting of all of the power gains and losses that a communication signal experiences in a telecommunication system (e.g., from a transmitter, through a medium (free space, cable, waveguide, fiber, etc.) to the receiver). Thus, the link budget threshold may be a value (e.g., received power in decibels (dB)) under which wireless broadband service may not be acceptable, such as not meeting the prescribed quality of service.

At 304, the method may include receiving housing data for the geographical region serviced by the network architecture data received above at 302, or for a geographical region for which a user may decide to perform an economic analysis. In some embodiments, the housing data may be received from any suitable housing database that may include data relating to housing density, population, population growth, housing growth, network usage statistics, housing types, demographic data, geographical terrain (e.g., urban, rural, mountain, forest, etc.), etc. In some embodiments, the housing data may be census data such as block level census data, which may include more than 11 million census blocks. At 306, based at least partially on the housing data for the geographical region, the method may include determining a network service projection for the geographical region. In some embodiments, the network service projection may include details related to usage demand projections for one or more different network types (e.g., 3G, 4G, 5G, etc.) and/or spectrums within those network types, how far subscriber locations may be from current network infrastructure (e.g., base stations), free capacity from mobile usage that may be used by broadband, etc. Those of ordinary skill in the art will appreciate that many other types of data may be included a network service projection for a given geographic region. In some embodiments, the method may include determining various network service projections based on various projections of growth of demand for network services (e.g., growth of home or business cellular broadband services).

At 308, the method may include receiving an input of network criteria. In some embodiments, the input of network criteria may be received from a user via a graphical user interface and may be chosen among a variety of options for network criteria. For example, quality of service (QoS), quality of experience (QoE), network efficiency, economic efficiency, or any other suitable measure of network quality, reliability, etc. In some embodiments, the network criteria may be determined automatically based on the geographic region or other factors, such as a predetermined measurement of network demand or quality that may be analyzed. In some embodiments, multiple criteria may be chosen, each of which the user may desire be satisfied for a given analysis, or may rank the relative importance of a given criterion or criteria upon which an economic analysis may be conducted. Each network criterion may be scored or valued in any of a variety of ways that may be quantified. For example, QoS may be valued on a scale from 1 to 10, as a percentage out of 100%, or any other suitable quantifiable metric consistent with the disclosure. In some embodiments, the selected criterion may be made up of one or more parameters relating to a particular network. For example, QoS may be made up of parameters such as speed, efficiency, reliability, availability, oversubscription ratio (e.g., required bandwidth to available bandwidth), etc. Quality indicators for QoS may vary per network and may relate to customer service or technological issues, such as packet loss, errors, latency, packet delay variation, throughput, jittery, delay, etc. In some embodiments, each parameter may have an individual value that may make up an overall value for QoS. At 310, the method may include receiving an input of a threshold service level. In some embodiments, the input may be received from a user via a graphical user interface or, in some embodiments, the threshold service level may be predetermined base on internal or external network quality standards for some network criterion. In some embodiments, threshold service levels may be selectable for some network criteria, but predetermined for others. In some embodiments, the network criteria may be specifically tailored to the types of parameters that may be important to supplying a particularly type of service, such as home or business cellular broadband services.

At 312, the method may include determining one or more updated network architectures based on the input of the threshold service level of at least one network criterion and the determined network service projection. The updated network architectures may include adapting existing architecture or adding new network infrastructure. In some embodiments, adapting existing network infrastructure may include deviating from traditional cell site or base station architecture. For example, in some embodiments, adapting existing network infrastructure may include creating or bolstering hub and spoke network arrangements such as that illustrated in FIG. 1 and FIG. 2. In some embodiments, the updated network architecture may include adding mmWave transport devices to existing base station locations to provide mmWave, LTE, or other data services to additional subscriber locations. In some embodiments, a subscriber location may act as a hub for the hub and spoke model, and other surrounding subscriber locations may be spokes that receive data services via the hub. In such embodiments, the updated network architecture may include adding network assets at the hub subscriber location.

In some embodiments, the determination of the one or more network architectures may be determined so as to satisfy the threshold service level of one or more network criteria. In some embodiments, the method may include determining various updated network architectures based on various network service projections and/or various threshold service level values. In some embodiments, the iteration process may include using a machine learning algorithm or other automated process for providing outputs based on multiple variable inputs. In some embodiments, determining the updated network architecture may include determining what network infrastructure or other assets may be implemented to satisfy the one or more threshold service levels for the geographical region at issue. In some embodiments, determining an updated network architecture may itself be an iterative process for each network service projection. For example, as shown in FIG. 3, the method may include determining updated network architecture at 312, and determining, at 314, whether the updated network architecture satisfies the one or more threshold service levels. If not, the method may include discarding the unsatisfactory network architecture and determining another updated network architecture at 312. In some embodiments, this iterative process may be repeated until the threshold service level is satisfied, until every plausible updated network architecture has been tested, or both. Of course, in some circumstances for certain geographic regions, it is possible that no economically viable solution may exist to provide a particular level of wireless broadband or other wireless services.

At 316, the method may include generating an updated network architecture report. In some embodiments, the report may include values of various network criteria for each particular updated network architecture. For example, the report may include QoS values, etc. In some embodiments, the report may include a map of the geographical area at issue with indicators for locations of existing network assets and location of updated network architecture, whether the updated architecture includes additions or modifications to existing network assets or new network asset locations. In some embodiments, the updated network architecture report may include a net present value (NPV) determination for each particular updated network architecture determination that satisfies the other network criteria. In some embodiments, the NPV may additionally be input as one of the network criteria with a threshold as well for input into the determination of the updated network architecture. The NPV calculation may be based on costs associated with developing the network infrastructure as determined in the updated network architecture, changes in revenues due to increased subscribers, costs associated with providing services to subscribers or customers in the geographic region, etc. Some cost drivers that may be considered in the NPV calculation may include capital expenditures (capex) such as costs to build cell sites and other infrastructure, operation expenditures (opex) such as costs to pay for cell site leases, backhaul and maintenance expenses, etc. In some embodiments, the report may include analysis of various geographical regions and may include a comparative analysis based on any of a variety of factors, such as NPV. For example, the report may include determined updated network architecture for various geographical regions and provide an NPV associated with providing the determined updated network architecture for each region. In some embodiments, the generated report may include a graph or other visual representation of the various geographical regions based upon the selected one or more network criteria and service level thresholds. Such comparative analysis may be used, for example, to help a user or service provider determine which geographical region may be more profitable based on a given time frame for the NPV calculation, such as five years, ten years, twenty years, etc. Those skilled in the art will appreciate that other visual or graphical representation may be used to illustrate the results of the analysis described herein.

In some embodiments, the service provider may use the generated updated network architecture report to install new network infrastructure according to the determined updated network architecture, or adapt existing network assets based on the updated network architecture so as to provide network service that may have been predicted in the analysis described above. In some embodiments, installing new or adapting existing network assets may include providing mmWave transport devices or other data transport hardware to existing base stations, new base stations, subscriber locations, etc. Thus, in some embodiments, the discloses system and methods may have the practical application of identifying and/or installing network hardware, software, etc., to increase efficiency or access to data services over cellular networks. In some embodiments, the system may specifically be implemented to provide home broadband to increasing subscriber locations delivered via a cellular network in an efficient manner. Further, the system and methods described herein at least provide a technical solution to the technical problem of determining and implementing cellular network infrastructure updates to maintain network service quality in view of growing demand and developing network services.

Figure 4:
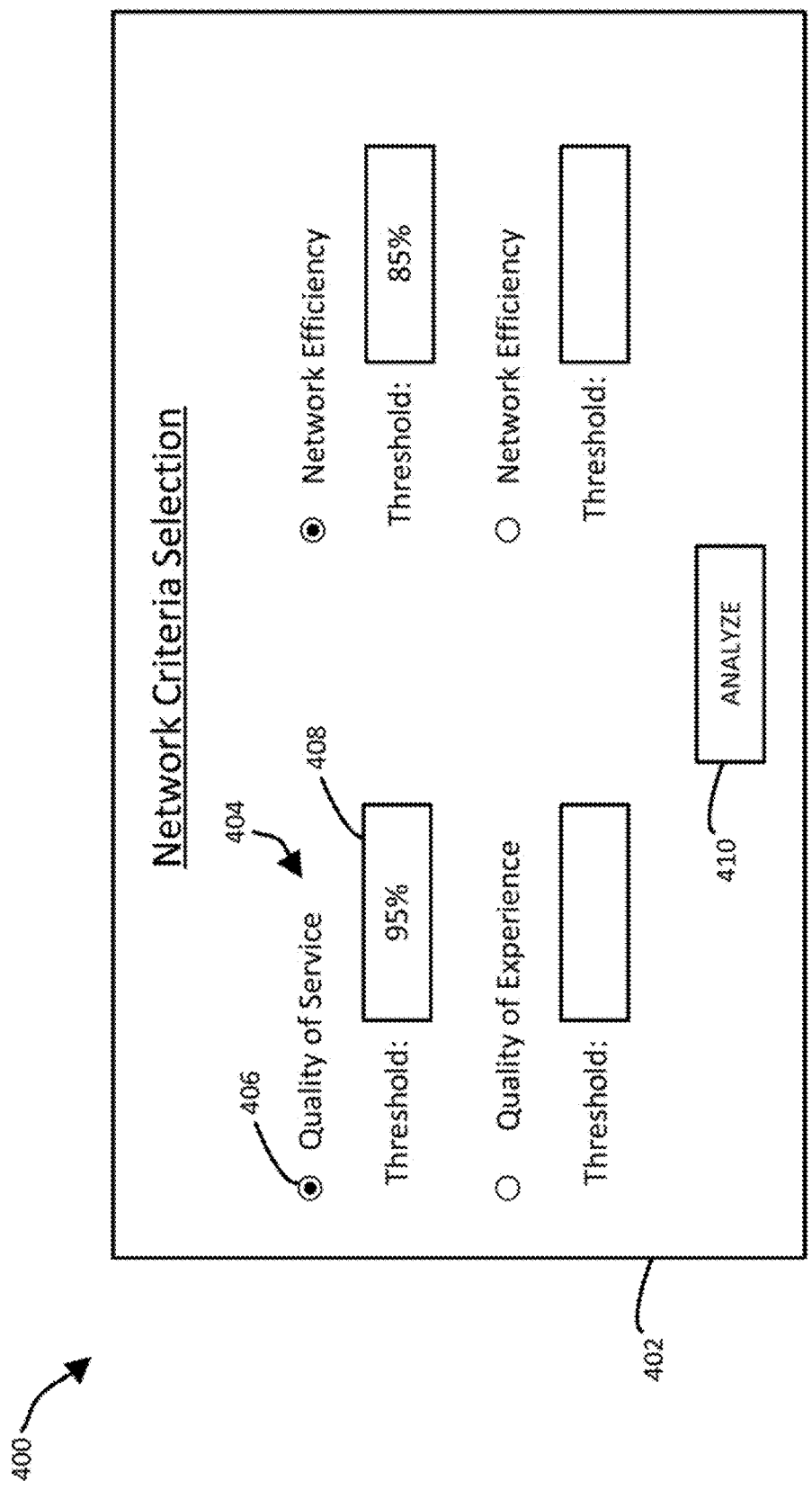
FIG. 4 is an embodiment of a graphical user interface that may be used in implementing the method of FIG. 3.

FIG. 4 illustrates an example of a graphical user interface (GUI) 400 that may be used in the system described herein to receive one or more user inputs associated with a network analysis. The GUI 400 may include a network selection screen 402 that may provide options for selection of network criteria and service level thresholds. Each listed network criterion 404 may include a selection operator 406, such as a radio button, a checkbox, or other suitable selection input. For each selected network criterion, the GUI 400 may include a service level threshold input field 408 to enter or otherwise select a service level threshold for the associated network criterion. In some embodiments, the service level threshold may represent the minimum value that may be acceptable for a given analysis. The GUI 400 may also include a button 410 that may activate the analysis as described herein. In some embodiments, the GUI 400 may also provide fields for selecting or otherwise indicating the one or more geographic regions for which an analysis may be performed. In some embodiments, the factors considered for an analysis and the criteria by which those factors may be weighed relative to one another may vary depending upon the type of service contemplated. For example, an analysis performed to determine the infrastructure needed or desired to provide wireless broadband services may differ in type and/or quality as compared to the infrastructure needed for mobile wireless services. This may be at least because different types of wireless services may include or require different planning guidelines or quality of service in order to provide a desired level of service and be financially or commercially viable. Accordingly, in some embodiments, when performing an analysis as described herein, the system may provide for a selection of the type of service contemplated and provide varying options for selection criteria as a result. Of course, those skilled in the art will recognized that the GUI 400 in FIG. 4 is merely exemplary and that GUIs in many different forms or formats may be contemplated within the scope of the disclosure.

Figure 5:
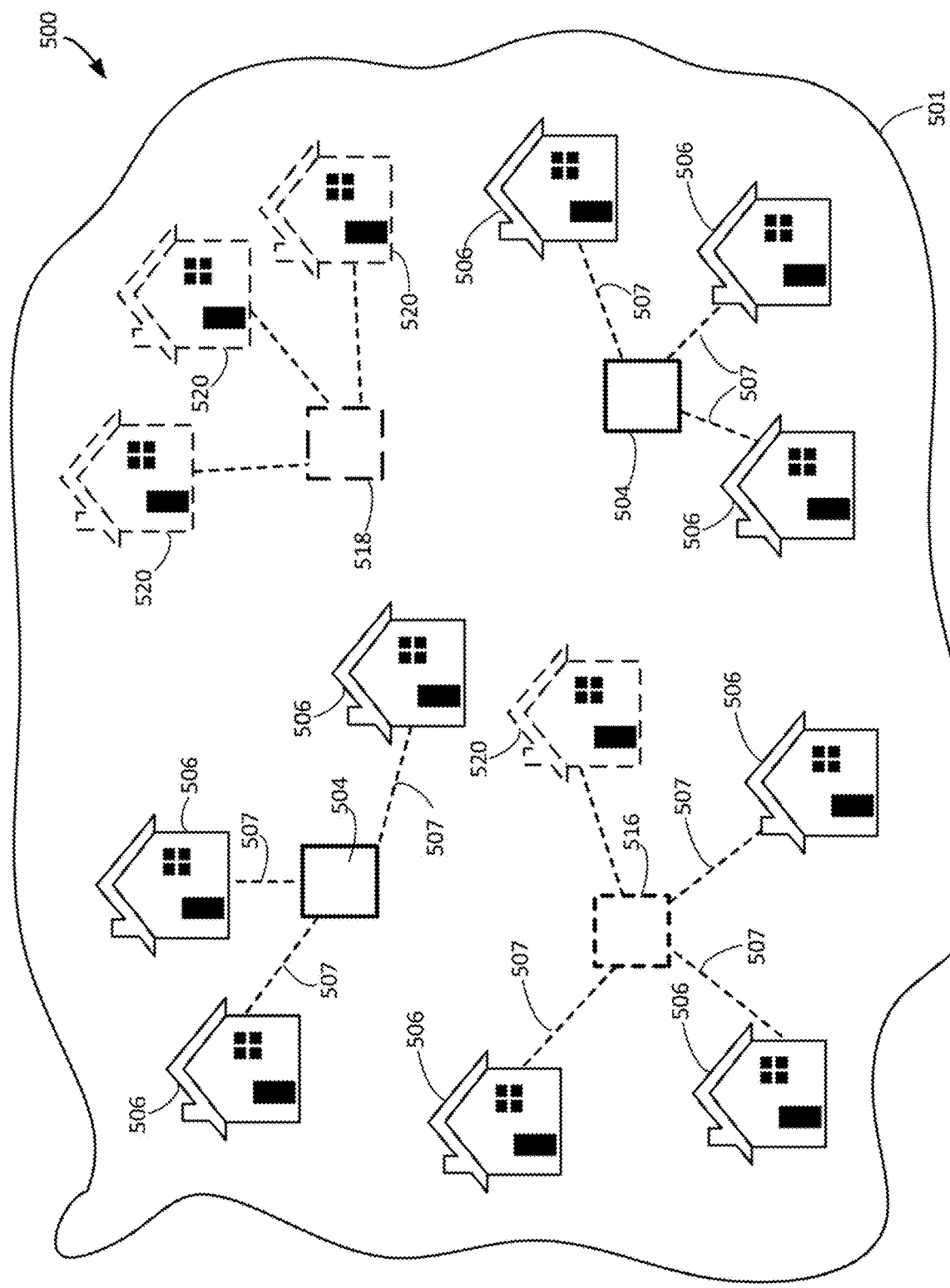
FIG. 5 is an embodiment of a report that may be generated in implementing the method of FIG. 3.

FIG. 5 illustrates an example of a report that may be generated based on the updated network architecture determination. The report may be a network architecture map 500 that may include visual representation of existing network architecture 504 (e.g., base stations 104 from FIG. 1), existing subscriber locations 506 (e.g., subscriber locations 106 from FIG. 1), and network service 507 within a particular geographic region 501. The map 500 may also include projected subscriber locations 520 within the geographic region 501, which may be represented with dashed lines. Based on the projected subscriber locations 520, the map 500 may also include a representation of adapted network assets 516 and new network assets 518. Adapted network assets 516 may be existing network assets (e.g., cell sites, base stations) that already provide services but that may be further adapted to change or increase the services provide or the number of subscriber locations it serves. New network assets (e.g., small cell cite, DAS, subscriber location spoke) 518 may be suggested at locations that have been determined based on at least partially on the location of projected subscriber locations 520 and other network criteria. Those skilled in the art will recognize that the map 500 in FIG. 5 is merely an exemplary portion of a report generated based on the disclosed systems and methods, and that many other reports or portions of reports may be provided as well within the scope of the disclosure.

Figure 6:
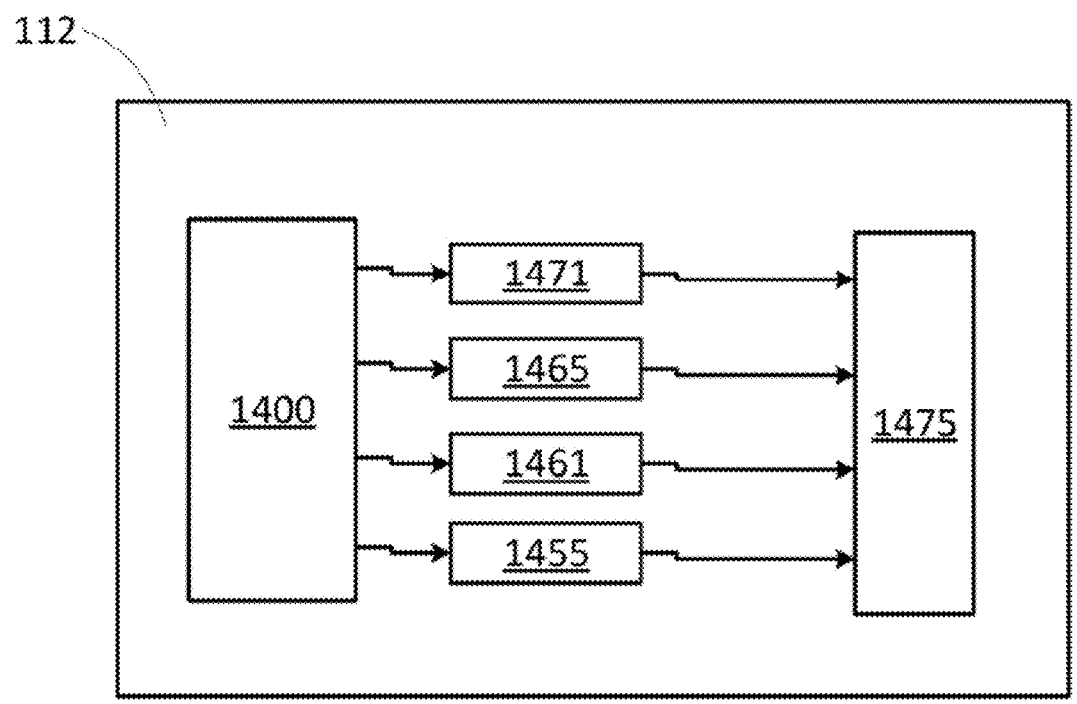
FIG. 6 is a schematic illustration of elements of an embodiment of an example computing device.
Figure 7:
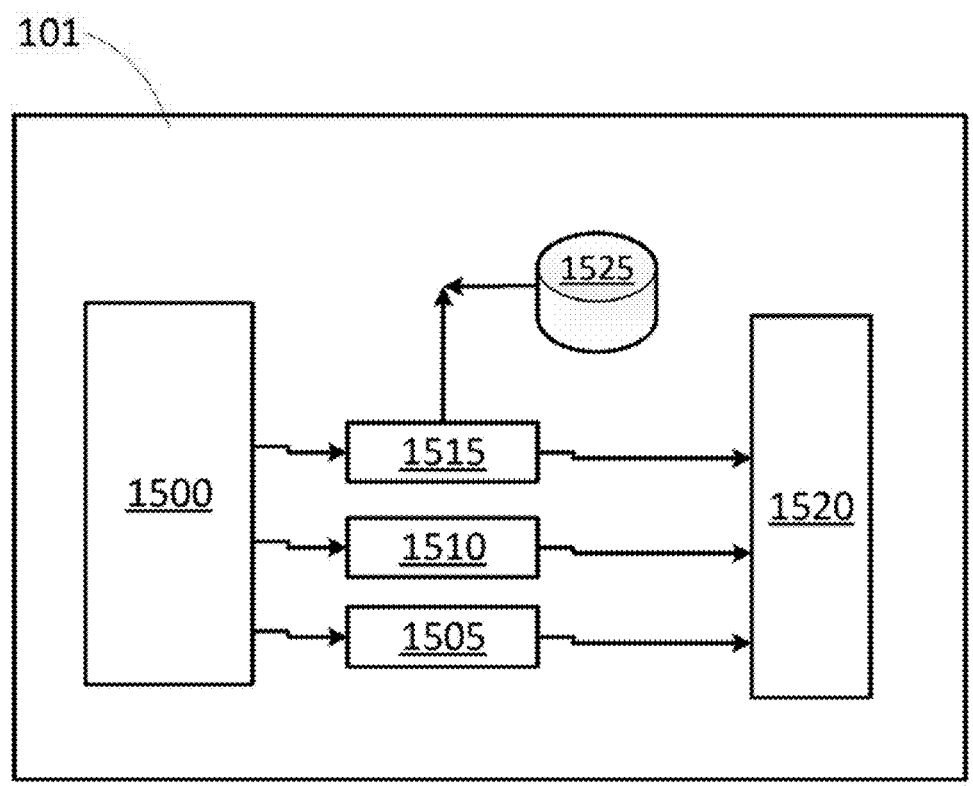
FIG. 7 is a schematic illustration of elements of an embodiment of a server type computing device.

FIG. 6 is a simplified illustration of the physical elements that make up an embodiment of a computing device 112 and FIG. 7 is a simplified illustration of the physical elements that make up an embodiment of a server type computing device, such as the network provider server 101. Referring to FIG. 6, a sample computing device 112 is illustrated that is physically configured according to be part of the subscriber location 106 shown in FIG. 2. The computing device 112 may have a processor 1451 that is physically configured according to computer executable instructions. In some embodiments, the processor can be specially designed or configured to optimize communication between the router 110 and the computing device 112 relating to home broadband service as described herein. The computing device 112 may have a portable power supply 1455 such as a battery, which may be rechargeable. It may also have a sound and video module 1461 which assists in displaying video and sound and may turn off when not in use to conserve power and battery life. The computing device 112 may also have volatile memory 1465 and non-volatile memory 1471. The computing device 112 may have GPS capabilities that may be a separate circuit or may be part of the processor 1451. There also may be an input/output bus 1475 that shuttles data to and from the various user input/output devices such as a microphone, a camera 59, a display 56, or other input/output devices. The computing device 112 also may control communicating with the networks, such as communication network 60 in FIG. 1, either through wireless or wired devices. Of course, this is just one embodiment of the computing device 112 and the number and types of computing devices 112 is limited only by the imagination.

The physical elements that make up an embodiment of a server, such as the network provider server 101, are further illustrated in FIG. 7. In some embodiments, the service provider server is specially configured to run the systems and methods described herein. At a high level, the network provider server 101 may include a digital storage such as a magnetic disk, an optical disk, flash storage, non-volatile storage, etc. Structured data may be stored in the digital storage such as in a database. More specifically, the server 101 may have a processor 1500 that is physically configured according to computer executable instructions. In some embodiments, the processor 1500 can be specially designed or configured to optimize analysis relating to the system and methods for maintaining network quality as described herein. The server 101 may also have a sound and video module 1505 which assists in displaying video and sound and may turn off when not in use to conserve power and battery life. The server 101 may also have volatile memory 1510 and non-volatile memory 1515.

A database 1525 for digitally storing structured data may be stored in the memory 1510 or 1515 or may be separate. The database 1525 may also be part of a cloud of servers and may be stored in a distributed manner across a plurality of servers. There also may be an input/output bus 1520 that shuttles data to and from the various user input devices such as a microphone, a camera, a display monitor or screen, etc. The input/output bus 1520 also may control communicating with the networks, such as cellular network 102, either through wireless or wired devices. Of course, this is just one embodiment of the network provider server 101 and additional types of servers are contemplated herein.

The figures depict preferred embodiments for purposes of illustration only. One skilled in the art will readily recognize from the following discussion that alternative embodiments of the structures and methods illustrated herein may be employed without departing from the principles described herein.

Upon reading this disclosure, those of skill in the art will appreciate still additional alternative structural and functional designs for the systems and methods described herein through the disclosed principles herein. Thus, while particular embodiments and applications have been illustrated and described, it is to be understood that the disclosed embodiments are not limited to the precise construction and components disclosed herein. Various modifications, changes and variations, which will be apparent to those skilled in the art, may be made in the arrangement, operation and details of the systems and methods disclosed herein without departing from the spirit and scope defined in any appended claims.

The invention claimed is:

1. A computer-implemented method comprising:
   providing a graphical user interface (GUI) for economic analyses of cellular networks;
   receiving, via the GUI, a user request to perform an economic analysis of a cellular network for a geographical region, the user request including:
   a user selection of at least one network criterion associated with the cellular network, and
   a user input of a threshold service level corresponding to the at least one network criterion;
   in response to the user request, requesting and receiving network architecture data relating to an infrastructure of a cellular network in the geographical region, the network architecture data including a location of one or more cellular base stations in the geographical region;
   receiving housing data for the geographical region from a housing database, the housing data including at least one growth projection for the geographical region;
   determining at least one network service projection for the geographical region based at least partially on the at least one growth projection of the housing data;
   based on the user input of the threshold service level of the at least one network criterion and the determined network service projection, determining an updated network architecture that satisfies the threshold service level under conditions of the network service projections using an iterative machine learning process; and
   generating an updated network architecture report indicating changes to the infrastructure of the cellular network in the geographical region to satisfy the threshold service level, the updated network architecture report including a network architecture map of the geographical region with visual representations of the updated network architecture,
   wherein the updated network architecture includes at least one base station and at least one fixed wireless device, wherein each fixed wireless device communicates with one of the at least one base station via millimeter wave (mmWave) technology, and wherein each of the at least one fixed wireless device is configured to provide network connection to one or more subscriber devices associated with the cellular network for the geographical region.

2. The method of claim 1, wherein the network service projection includes a number of projected subscriber locations in the geographical region.

3. The method of claim 1, wherein determining the updated network architecture includes making a net present value determination associated with the updated network architecture.

4. The method of claim 1 further comprising implementing the updated network architecture based on updated network architecture.

5. The method of claim 1 further comprising determining that at least one subscriber location does not have line of sight to any of the at least one base station based on geographical terrain information.

6. The method of claim 1, wherein the network service projection is for home broadband services.

7. The method of claim 1, wherein the updated network architecture report includes a comparison of multiple geographic regions.

8. The method of claim 7, wherein the comparison of multiple geographic regions is based on a net present value associated with the updated network architecture for each respective geographic region.

9. The method of claim 1, wherein determining the network service projection includes iterating a plurality of network service projections.

10. A computer-implemented method comprising:
    providing a graphical user interface (GUI) for economic analyses of cellular networks;
    receiving, via the GUI, a user request to perform an economic analysis of a cellular network for a plurality of geographical regions, the user request including:
    a user selection of at least one network criterion associated with the cellular network, and
    a user input of a threshold service level corresponding to the at least one network criterion;
    receiving network architecture data relating to an infrastructure of a cellular network in the plurality of geographical regions, the network architecture data including a location of one or more cellular base stations in each of the plurality of geographical regions;
    receiving housing data for each of the plurality of geographical regions, the housing data including at least one growth projection for each of the plurality of geographical regions;

determining at least one network service projection for each of the plurality of geographical regions based at least partially on the at least one growth projection of the housing data;

based on the user input of the threshold service level of the at least one network criterion and the determined network service projection, determining an updated network architecture that satisfies the threshold service level under conditions of the network service projections for each of the plurality of geographic regions using an iterative machine learning process; and generating an updated network architecture report for each of the plurality of geographic regions comparing changes to the infrastructure of the cellular network to satisfy the threshold service level in each of the plurality of geographical regions, the updated network architecture report including network architecture maps with visual representations of the updated network architecture for each of the plurality of geographical regions, wherein the updated network architecture includes at least one base station and at least one fixed wireless device, wherein each fixed wireless device communicates with one of the at least one base station via millimeter wave (mmWave technology, and wherein each of the at least one fixed wireless device is configured to provide network connection to one or more subscriber devices associated with the cellular network for the geographical region.

11. The method of claim 10 further comprising determining a net present value for the updated network architecture for each of the plurality of geographic regions.

12. The method of claim 10, wherein one of the at least one network criterion associated with the cellular network is a net present value.

13. The method of claim 10 further comprising determining that at least one subscriber location does not have line of sight to any of the at least one base station based on geographical terrain information.

14. A computer-implemented method comprising:

receiving network architecture data relating to an infrastructure of a cellular network in a geographical region, the network architecture data including a location of one or more network assets in the geographical region;

providing a graphical user interface (GUI) for requesting and receiving a user selection of at least one network criterion associated with the cellular network and a threshold service level corresponding to the at least one network criterion;

receiving a user selection of at least one network criterion associated with the cellular network via the graphical user interface;

receiving a user input of a threshold service level corresponding to the selected at least one network criterion via the graphical user interface;

receiving housing data for the geographical region, the housing data including a plurality of growth projections for the geographical region;

determining a plurality of network service projections for the geographical region based at least partially on the plurality of growth projections of the housing data, the plurality of network service projections each including a projected demand for cellular home broadband service;

based on the user input of the threshold service level of the selected at least one network criterion and the determined plurality of network service projections, determining an updated network architecture that satisfies the user input of the threshold service level under conditions of the plurality of network service projections using an iterative machine learning process; and generating an updated network architecture report indicating changes to the infrastructure of the cellular network in the geographical region to satisfy the user input of the threshold service level, the updated network architecture report including a network architecture map of the geographical region with visual representations of the updated network architecture for each of the plurality of network service projections, wherein the updated network architecture includes at least one base station and at least one fixed wireless device, wherein each fixed wireless device communicates with one of the at least one base station via millimeter wave (mmWave) technology, and wherein each of the at least one fixed wireless device is configured to provide network connection to one or more subscriber devices associated with the cellular network for the geographical region.

15. The method of claim 14, wherein one of the at least one network criterion associated with the cellular network is quality of service.

16. The method of claim 14 the updated further comprising determining that at least one subscriber location does not have line of sight to any of the at least one base station based on geographical terrain information.

* * * * *